H. H. AND G. H. BERG.
FARM GATE LATCH.
APPLICATION FILED JULY 17, 1920.
1,403,732.
Patented Jan. 17, 1922.
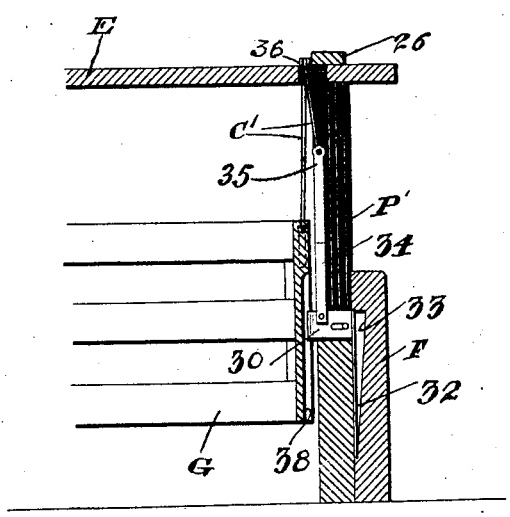
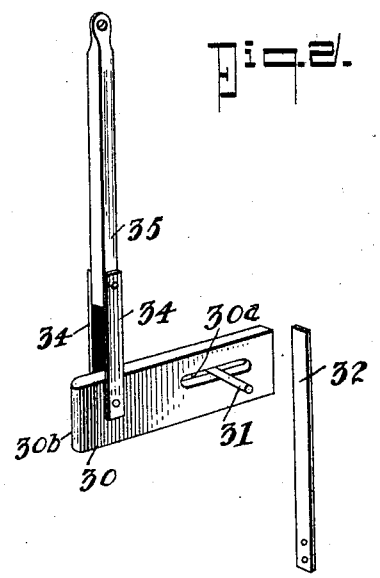
WITNESSES
INVENTOR
H. H. Berg.
G. H. Berg.
BY
ATTORNEYS

UNITED STATES PATENT OFFICE.

HERMAN HENRY BERG AND GEORGE HENRY BERG, OF THORNBURG, COLORADO.

FARM-GATE LATCH.

1,403,732.  Specification of Letters Patent.  Patented Jan. 17, 1922.

Application filed July 17, 1920. Serial No. 396,971.

*To all whom it may concern:*

Be it known that we, HERMAN HENRY BERG and GEORGE HENRY BERG, both citizens of the United States, and residents of Thornburg, in the county of Rio Blanco and State of Colorado, have invented certain new and useful Improvements in Farm-Gate Latches, of which the following is a specification.

Our invention relates to gate latches and more particularly to latches for farm gates, the purpose of our invention being the provision of a gate latch of extremely simple and efficient construction which is operable to automatically latch a gate when the same is swung to closed position.

We will describe one form of gate latch embodying our invention and will then point out the novel features thereof in claims.

In the accompanying drawings:

Figure 1 is a view showing in vertical section a conventional form of gate having applied thereto one form of gate latch embodying our invention.

Figure 2 is a perspective view of the gate latch attached to the gate.

Referring specifically to the drawings and particularly to Figure 1, we have here shown only that portion of a conventional form of farm gate of the horizontal swinging type which is necessary to a clear understanding of the construction and operation of our invention. The gate is designated generally at G and in closed position has its free end disposed adjacent a post P′ and the fence post F. The post P′ has its upper portion bifurcated or slotted and connected to beams E and 26 which constitute portions of a supporting frame for the latch actuating mechanism.

The gate latch forming the subject matter of our invention comprises a latch bar 30 disposed in the bifurcated portion of the post P′ and confined therein by means of a pin 31 which works in a slot $30^a$ formed in the latch bar. The forward end of the latch bar 30 is rounded as at $30^b$ while its rear end is flat and is adapted to be engaged by a leaf spring 32 secured to the inner face of the fence post F and working within a tapered recess 33 formed therein. Pivotally connected to the latch bar 30 at a point adjacent its forward end is a pair of arms 34 to which is secured a bar 35. The arms and bar are mounted for vertical movement within the bifurcated portion of the post P′, and the upper end of the bar 35 is connected to a cable C′ which is trained over a pulley supported on the beam 26. The cable C′ is adapted to extend to a remote point so that the gate latch can be actuated from a distance.

In practice, the rounded end $30^b$ of the latch bar normally projects from the inside face of the post P′ under the action of the spring 32 and a latching of the gate G is effected by the latch bar engaging the walls of a groove 38 formed in the free end of the gate G. With the bar in latching position as shown in Figure 1, it engages the walls of the groove and thus permits movement of the gate in either direction in closed position. When it is desired to move the latch bar to released position the cable C′ is pulled and by elevating the bar 35 it effects a similar movement of the forward end of the latch bar 30. When the bar 30 has been elevated sufficiently to move its forward end from the groove 38, the gate is free to move to open position. However, as soon as the cable is released, the latch bar gravitates to its normal position as will be understood. It is to be noted that the rounded end $30^b$ of the latch bar 30 permits of the gate being swung to closed position and latched with the latch bar in latching position, the pin and slot allowing of the limited rearward movement of the latch bar when the gate G engages the same so that it may move into the groove 38. The spring 32 returns the latch to latching position after being retracted.

Although we have herein shown and described only one form of gate latch embodying our invention, it is to be understood that various changes and modifications may be made herein without departing from the spirit of the invention or the spirit and scope of the appended claims.

What I claim is:

1. In combination, a horizontal swinging gate having a groove formed therein, a latch post having an opening formed therein, a pin within said opening, a latch bar having a slot for receiving said pin, a spring engageable with the latch bar for biasing the same in the direction of said groove, a bar connected to the latch bar for elevating the same, and means for actuating said bar.

2. A gate latch comprising, a slotted support, a latch bar of rectangular form slidably fitted within the slot, one end of the bar having its vertical edge rounded, a slot formed on the bar, a pin secured within the support spanning said slot and extending through the slot in said bar, a leaf spring engageable with one end of the bar for biasing the latter in one direction, and means connected to the bar for elevating one end of the same.

HERMAN HENRY BERG.
GEORGE HENRY BERG.